(12) United States Patent
Dominguez et al.

(10) Patent No.: US 11,841,347 B2
(45) Date of Patent: Dec. 12, 2023

(54) METHOD FOR CHECKING AN ULTRASOUND PROBE IN THE CONTEXT OF A STRUCTURAL INSPECTION OF A PART

(71) Applicant: Airbus Operations SAS, Toulouse (FR)

(72) Inventors: Nicolas Dominguez, Toulouse (FR); Aurélien Rautureau, Toulouse (FR); Bertrand Jarry, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 69 days.

(21) Appl. No.: 17/704,254

(22) Filed: Mar. 25, 2022

(65) Prior Publication Data

US 2022/0317094 A1 Oct. 6, 2022

(30) Foreign Application Priority Data

Apr. 1, 2021 (FR) ...................................... 2103392

(51) Int. Cl.
*G01N 29/44* (2006.01)
*G01N 29/12* (2006.01)
*G01N 29/24* (2006.01)

(52) U.S. Cl.
CPC ......... *G01N 29/4427* (2013.01); *G01N 29/12* (2013.01); *G01N 29/24* (2013.01); *G01N 2291/023* (2013.01); *G01N 2291/0289* (2013.01); *G01N 2291/105* (2013.01); *G01N 2291/2694* (2013.01)

(58) Field of Classification Search
CPC .... G01N 29/4427; G01N 29/12; G01N 29/24; G01N 2291/023; G01N 2291/0289; G01N 2291/105; G01N 2291/2694; G01N 29/043; G01N 2291/044; G01N 2291/101; G01N 2291/106; G01N 29/2475; G01N 29/30; G01N 29/46; G01N 29/4436

See application file for complete search history.

(56) References Cited

U.S. PATENT DOCUMENTS

| | | | | |
|---|---|---|---|---|
| 4,240,281 A | * | 12/1980 | Lather | ................... G01N 29/30 73/1.82 |
| 2015/0168355 A1 | | 6/2015 | Habermehl et al. | |
| 2015/0198470 A1 | * | 7/2015 | Brown | ................... G01F 25/10 73/861.27 |
| 2018/0231508 A1 | | 8/2018 | Lepage | |

OTHER PUBLICATIONS

French Search Report; priority document.

* cited by examiner

*Primary Examiner* — Tarun Sinha
(74) *Attorney, Agent, or Firm* — Greer, Burns & Crain, Ltd.

(57) ABSTRACT

A method for checking an ultrasound probe which includes taking a measurement using the probe bonded to the part and in comparing the results with a prerecorded reference recording, and, if there is divergence, in using a tool previously used to produce the reference recording to identify whether the probe is not bonded or not working properly. Such a checking method makes it possible to check the state of the probe without having to remove it.

4 Claims, 3 Drawing Sheets

METHOD FOR CHECKING AN ULTRASOUND PROBE IN THE CONTEXT OF A STRUCTURAL INSPECTION OF A PART

CROSS-REFERENCES TO RELATED APPLICATIONS

This application claims the benefit of the French patent application No. 2103392 filed on Apr. 1, 2021, the entire disclosures of which are incorporated herein by way of reference.

BACKGROUND OF THE INVENTION

The present invention relates to a method for checking an ultrasound probe in the context of a structural inspection of a part, and to calibration tools used in the context of the checking method.

SUMMARY OF THE INVENTION

The structural inspection of a part is performed using a non-destructive testing system. For this, a number of technologies are known, such as the use of a single-element ultrasound probe or of a multiple-element ultrasound probe. Such a multiple-element probe comprises a plurality of ultrasound transmitters and a plurality of ultrasound sensors.

When the beam transmitted by the one or more transmitters reaches an edge of the part or a defect in the part such as a crack, this beam is reflected and at least part of the reflected beam is detected by the one or more sensors. Measuring the time between the transmission of the beam and the reception of the reflected beam allows the position of the defect in the part to be characterized.

In the case of a multiple-element ultrasound probe, it is possible to choose the sources that will transmit ultrasound, in order to generate a wavefront that propagates in the desired direction.

Upon receiving the ultrasound waves, the various sensors generate electrical signals which are transmitted to a control unit of the probe where they are processed in the form of "combined" signals and are sent to a screen in order to be displayed in the form of an image depicting the waves or in the form of a frequency spectrum of the combined signals. The ultrasound waves are thus captured by the sensors and transformed by the control unit of the multiple-element ultrasound probe into electrical signals which may in turn be transmitted and displayed on a screen, where a technician may view the result.

When using such a testing system, it is advisable to calibrate the testing chain before performing measurements on the part in order to check that the single-element or multiple-element ultrasound probe is working properly.

In a known manner, calibration comprises using a calibration block to which the single-element or multiple-element ultrasound probe is attached, and then in taking the appropriate check measurements which make it possible to confirm whether the single-element or multiple-element ultrasound probe is working properly.

Increasingly, such a single-element or multiple-element ultrasound probe is bonded to the part for the long term. In particular, on some parts of an aircraft, such single-element or multiple-element ultrasound probes are permanently bonded thereto, and these single-element or multiple-element ultrasound probes allow a defect to be detected if and when it appears.

However, permanently attaching the ultrasound probe does not allow a calibration block to be used to calibrate the ultrasound probe and it is therefore necessary to seek a checking method that makes it possible to check that the ultrasound probe is still well calibrated even though it is bonded to a part.

SUMMARY OF THE INVENTION

One object of the present invention is to propose a method for checking an ultrasound probe bonded to a part without having to separate the probe from the part.

To that end, a method for checking an ultrasound probe is proposed, this method comprising:
- a provision step in which a part having a region to be monitored and to which the probe is attached is provided,
- a first retrieval step in which a reference recording relating to the probe is retrieved from a memory in which it is stored,
- a first activation step in which ultrasound waves are transmitted by at least one transmitter of the probe, received by at least one sensor of the probe, and transformed into combined signals by a control unit of the probe,
- a first comparison step in which a frequency spectrum of the signals thus combined is compared with a frequency spectrum of combined signals relating to the region to be monitored of the reference recording,
- if the comparison is positive, the checking method is stopped,
- if the comparison is negative, the checking method continues with:
  - a second retrieval step in which a tool comprising a block comprising a material that allows the transmission of the ultrasound waves in which a known defect is embedded and which comprises a contact face, and the information for which is recorded in the reference recording, is retrieved,
  - a placement step in which the contact face of the tool thus retrieved is placed at a precise location for establishing the reference recording,
  - a second activation step in which ultrasound waves are transmitted by the at least one transmitter of the probe, received by the at least one sensor of the probe, and transformed into combined signals by the control unit of the probe, and
  - a second comparison step in which the signals thus combined are compared with combined signals relating to the known defect of the reference recording,
- if the comparison is positive, the checking method continues with a recording step in which the signals thus combined are recorded in the reference recording,
- if the comparison is negative, the checking method continues with a maintenance step, in which the probe undergoes maintenance operations.

Such a checking method makes it possible to check the state of the probe without having to remove it.

Advantageously, the method comprises a phase of establishing a reference after the installation of the probe on the part, and the establishment phase comprises:
- a placement step in which a contact face of a tool comprising a block comprising a material that allows the transmission of the ultrasound waves in which a known defect is embedded is placed at a precise location on a face of the part, an activation step in which ultrasound waves are transmitted by the at least one transmitter of the probe, received by the at least one sensor of the probe, and transformed into combined signals by the control unit of the probe, and a data recording step, in which the signals thus combined are stored in the form of a reference recording in a memory.

BRIEF DESCRIPTION OF THE DRAWINGS

The abovementioned features of the invention, along with others, will become more clearly apparent from reading the following description of one exemplary embodiment, the description being given with reference to the appended drawings, in which.

DETAILED DESCRIPTION OF THE PREFERRED EMBODIMENTS

Although the description below is more particularly aimed at a multiple-element ultrasound probe, it applies in the same way to an ultrasound probe consisting of a single transmitter/receiver pair.

Figure 1:
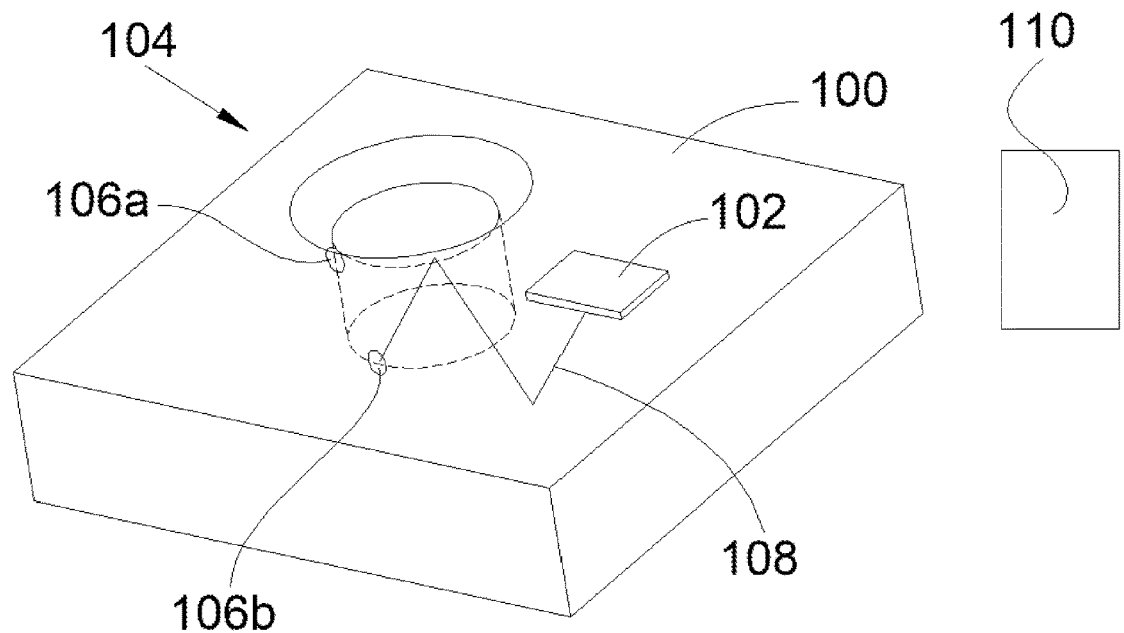
FIG. 1 is a perspective view of a part with a multiple-element ultrasound probe.

FIG. 1 shows a part 100, against a face of which a multiple-element ultrasound probe 102 is bonded. The probe 102 is supplied with power by electrical conductors (not shown) and, in the same way, the data transmitted by the probe 102, for example to a screen 110, are transmitted by data cables (not shown) or by any wireless transmission means. Such a probe 102 comprises a plurality of ultrasound transmitters and a plurality of ultrasound sensors.

The part 100, which may be an aircraft part, comprises a region to be monitored 104 which, in this case, is a bore around which defects 106a-b are liable to appear.

Like in the case of the prior art, the transmitters of the probe 102 transmit ultrasound waves 108 which, after reflection, are received by the sensors of the probe 102 which transform them into electrical signals which are transmitted to a control unit of the probe 102, where they are processed in the form of "combined" signals and in the form of a frequency spectrum of the combined signals, and transmitted to the screen 110 in order to be displayed in the form of an image depicting the waves which is viewed by a technician. The control unit is, for example, a computer or the like. The frequency spectrum of the combined signals is the result of a Fourier transform on the combined signals.

Figure 2:
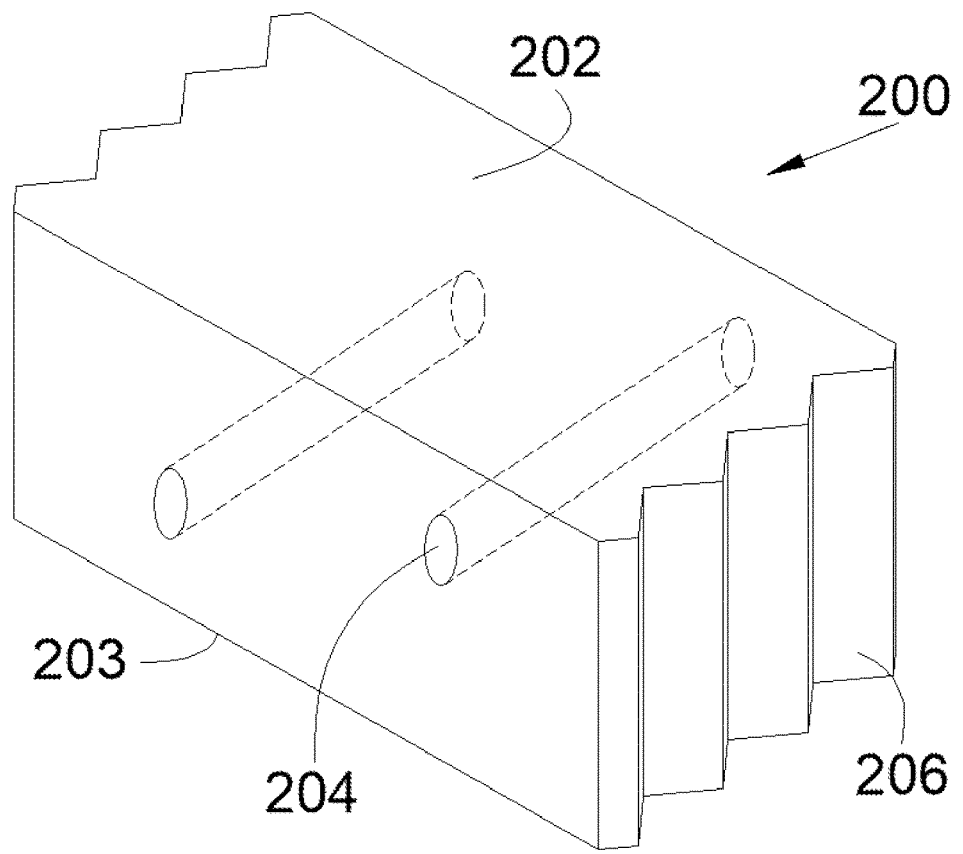
FIG. 2 is a perspective view of a calibration tool according to a first embodiment of the invention.

FIG. 2 shows a tool 200 for calibrating the probe 102 according to a first embodiment.

The tool 200 takes the form of a block 202 made of a material that allows the transmission of the ultrasound waves. This material is a material that does not attenuate much acoustically, and which has an acoustic impedance close to that of water and may be, for example, poly(methyl methacrylate), in particular Plexiglass®, or crosslinked polystyrene copolymer, in particular Rexolite®.

The block 202 is a rectangular parallelepiped and it comprises a contact face 203 which is a planar bearing face that is placed on the part 100 in the calibration method described below.

At least one known "defect" 204 is produced inside the block 202, in this case a bore 204 which goes through the block 202. This known defect 204 is therefore embedded in a material that allows the transmission of the ultrasound waves. The axis of each bore 204 is here parallel to the contact face 203. The defect is known in terms of its dimensions, positions and orientations.

Of course, any other types of known defect may be added to the block 202. These may be, for example, holes of different shapes, for example parallelepipedal holes, or inserts added to the block 202.

In the embodiment presented in FIG. 2, the block 202 has a wavebreaker device 206 on two opposing lateral faces of the block 202. Each wavebreaker device 206 allows stray ultrasound waves which might be reflected by the lateral faces to be absorbed. In the embodiment of FIG. 2, each wavebreaker device 206 takes the form of triangular notches extending perpendicular to the contact face 203.

In the embodiment of FIG. 2, the two opposing lateral faces are the faces perpendicular to the contact face 203 and parallel to the axes of the bores 204, but it is possible to place the wavebreaker devices on the two other faces of the block 202 adjacent to the contact face 203.

In order to take multiple measurements, it is possible to slide the contact face 203 of the tool 200 against the part 100 in order to carry out calibration in various positions of the tool 200. These various measurements are then recorded with the corresponding positions.

Figure 3:
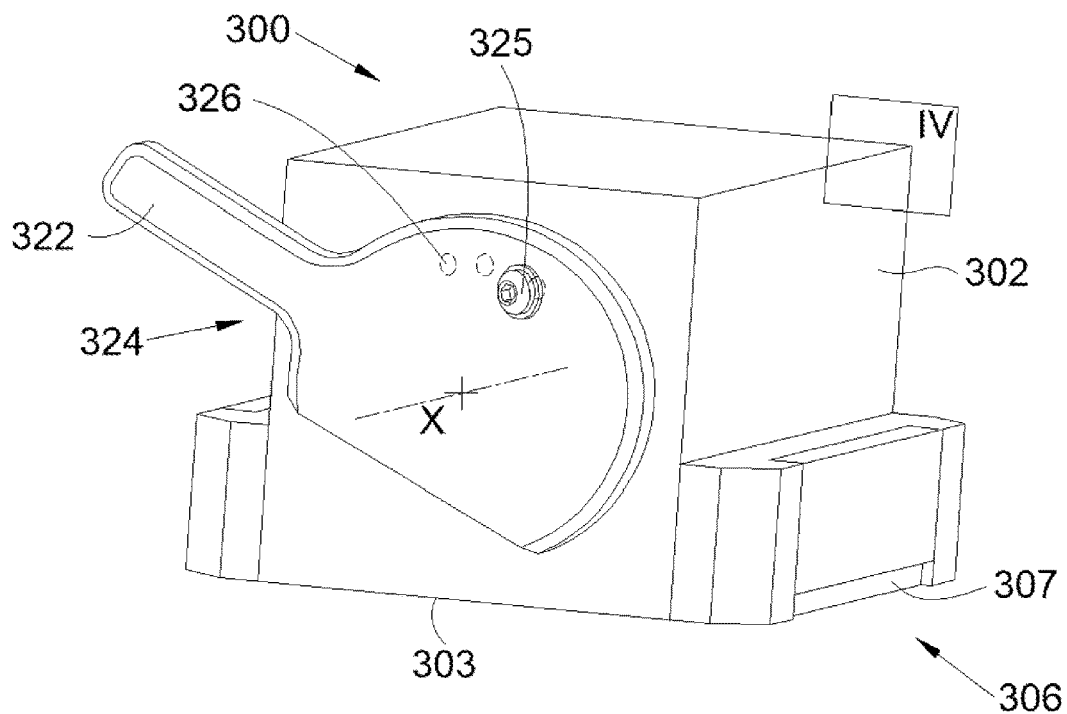
FIG. 3 is a perspective view of a calibration tool according to a second embodiment of the invention.
Figure 4:
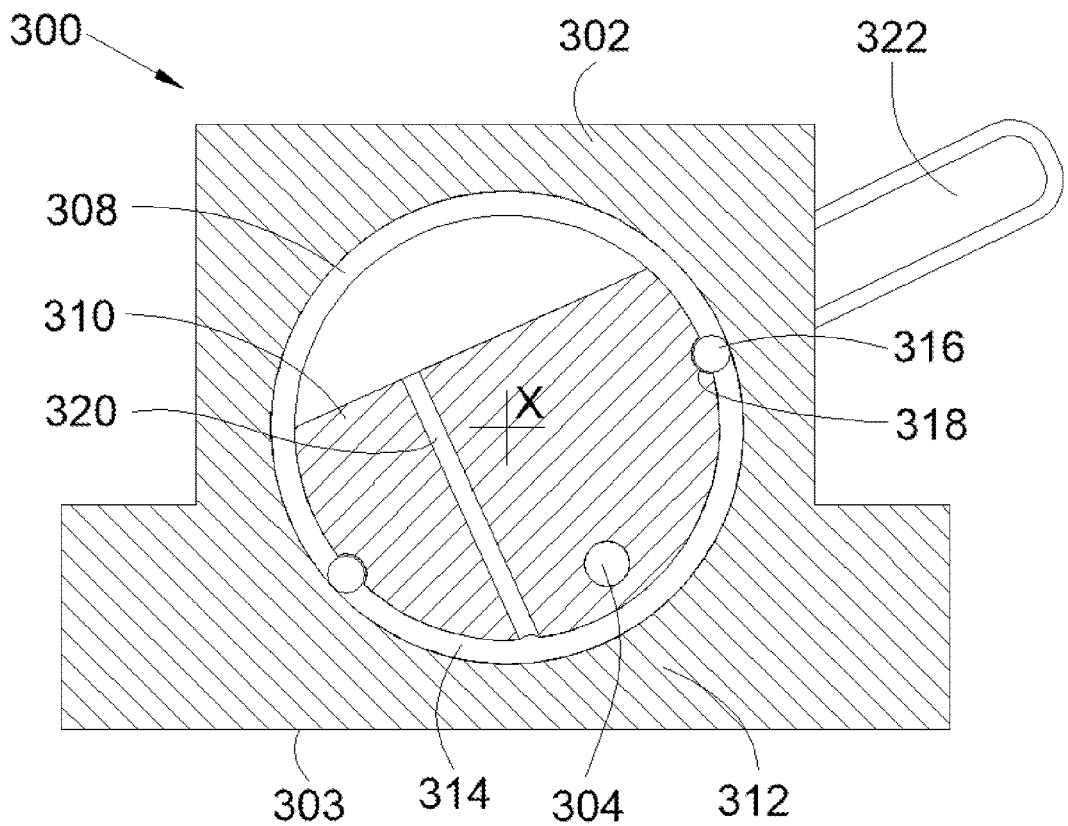
FIG. 4 is a sectional view through the plane IV of the tool of FIG. 3.

FIG. 3 and FIG. 4 show a tool 300 for calibrating the probe 102 according to a second embodiment.

The tool 300 comprises a housing 302 which comprises a contact face 303 which is a planar bearing face that is placed on the part 100 in the calibration method.

The housing 302 comprises a chamber 308 which is a cylindrical hollow with a base that is at least semicircular, i.e., semicircular or circular. The chamber 308 thus comprises a central axis X.

This chamber 308 is intended to accommodate a drum 310 and to allow the drum 310 to rotate about the central axis X. The drum 310 is also cylindrical in shape, and at least partially complementary to the cylindrical shape of the chamber 308.

The drum 310 is made of a material that allows the transmission of the ultrasound waves. Likewise, at least the lower portion 312 of the housing 302, i.e., the portion between the contact face 303 and the drum 310, is made of a material that allows the transmission of the ultrasound waves.

Such materials are materials that do not attenuate much acoustically, and which have an acoustic impedance close to that of water and are, for example, poly(methyl methacrylate), in particular Plexiglass®, or crosslinked polystyrene copolymer, in particular Rexolite®.

A known "defect" 304 is produced inside the drum 310, in this case a bore 304 which goes through the drum 310. The known defect 304 is thus embedded in a material that allows the transmission of the ultrasound waves. The axis of the bore 304 is here parallel to the contact face 203 and to the central axis X. The known defect 304 is preferably in the lower portion of the drum 310, i.e., as close as possible to the contact face 303, so as to avoid the ultrasound waves having to pass through the entire drum 310 to reach the known defect 304.

The defect is known in terms of its dimensions, positions and orientations.

Of course, any other types of known defect may be added to the drum 310. These may be, for example, holes of different diameters, or of different shapes, or inserts added to the drum 310.

Between the drum 310 and the housing 302, and more particularly the lower portion 312, the tool 300 has a gap 314 which holds a bath of couplant which may be, for example, a gel allowing the transmission of the ultrasound waves through the gap 314.

To limit the volume of the bath of couplant to the lower region of the drum 310, a seal 316 is housed in a groove 318 in the drum 310. The seal 316 is, in this case, an O-ring and the groove 318 goes all the way around the drum 310 in a plane parallel to the central axis X. The seal 316 is thus rectangular in shape. The seal 316 is arranged on either side of the known defect 304 so as to ensure that there is always couplant in the gap 314 facing the known defect 304.

To allow the bath of couplant to be filled and drained, the drum 310 is pierced with at least one duct 320, a first end of which opens into the gap 304 where the bath of couplant is and a second end of which is intended to be connected to a filling or draining system.

To facilitate the rotation of the drum 310, the tool 300 comprises a gripping means 322, a handle here, which is rigidly connected to the drum 310 and is accessible from the exterior of the housing 302. For this, a portion of the drum 310 extends out of the housing 302 to allow the gripping means 322 to be attached to the portion.

To facilitate locking of the drum 310 in position, the tool 300 comprises a locking system 324 which takes either a locking position in which it prevents the drum 310 from rotating with respect to the housing 302 or a release position in which it does not prevent the drum 310 from rotating with respect to the housing 302 and therefore allows it to rotate.

The locking system 324 may be, for example, a bolt 325 that passes through an orifice in the handle 322 and screws into a tapped hole 326 in the housing 302 provided for that purpose. To allow the drum 210 to stop in various positions, multiple tapped holes 326 are provided.

The locking system 324 may take other forms such as, for example, a ball on a spring installed in the housing 302 and a plurality of recesses distributed over the handle 324, where the ball may stop successively in each recess in order to lock the drum 210 in a particular position.

The housing 302 has a wavebreaker device 306 on two opposing lateral faces of the housing 302. Each wavebreaker device 306 allows stray ultrasound waves which might be reflected by the lateral faces to be absorbed. In the embodiment of FIGS. 3 and 4, each wavebreaker device 306 takes the form of a rubber member 307 flush with the surface of the part 100.

In the embodiment of FIGS. 3 and 4, the two opposing lateral faces are the faces perpendicular to the contact face 303 and parallel to the central axis X, but it is possible to place the wavebreaker devices on the two other faces of the housing 302 adjacent to the contact face 303.

The tool 300 thus makes it possible to modify the position of the defect 304 in order to adapt this position to the environment in order to have a satisfactory interaction with the ultrasound waves 108. This tool 300 thus replaces a plurality of tools with known defects which are fixed in position and orientation like the tool 200 of the first embodiment.

It is possible to take measurements for various angular positions of the drum 310 and to record them with the corresponding angular positions.

Thus, in general, each tool 200, 300 comprises a block comprising a material that allows the transmission of the ultrasound waves in which a known defect 204, 304 is embedded. In the embodiment of FIG. 2, the block is the block 202. In the embodiment of FIGS. 3 and 4, the block is formed by the drum 310 and the lower portion 312 of the housing 302.

Figure 5:
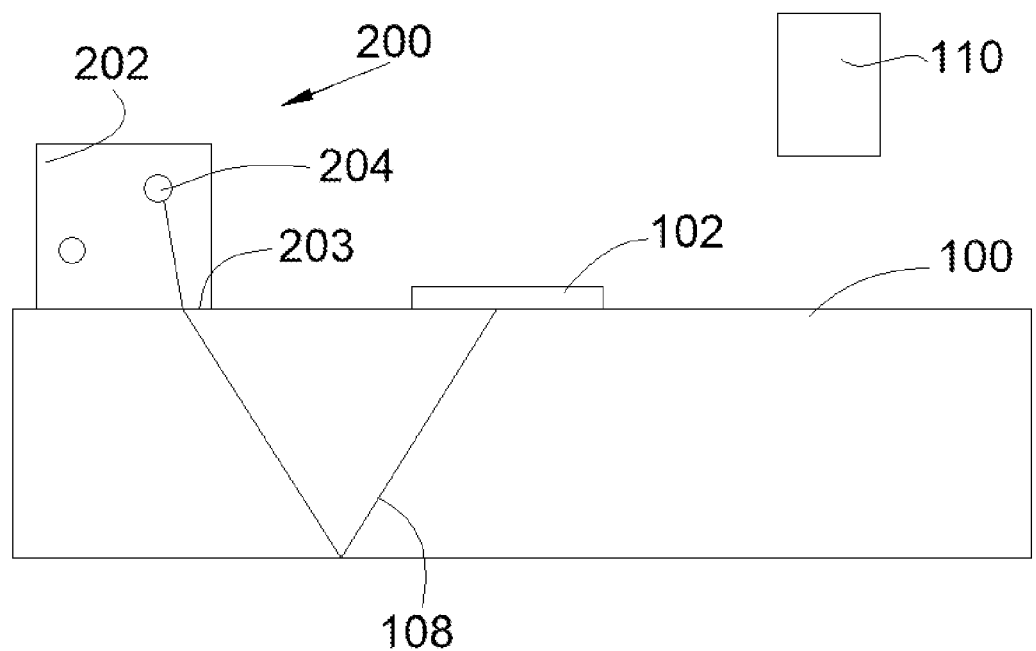
FIG. 5 is a side view of a calibration tool in position on the part to be inspected, and FIG. 6 schematically illustrates one example of the hardware architecture of an ultrasound probe.

FIG. 5 shows an example of use of the tool 200 according to the first embodiment, but the principle is the same with the tool 300 according to the second embodiment.

The tool 200 is arranged on the part 100 with its contact face 203 against the surface of the part 100 and so that the ultrasound waves 108 transmitted by the transmitters of the probe 102 penetrate into the tool 200 and encounter the known defect 204 through the material that allows the transmission of the ultrasound waves.

The ultrasound waves are then reflected by the defect 204 and they are captured and transformed by the sensors of the probe 102 into electrical signals which are, in turn, processed by the control unit of the probe 102 and transmitted to the screen 110 in the form of "combined" signals or in the form of a frequency spectrum of the combined signals, where a technician may view the result.

Prior to implementing the method for checking the probe 102, the checking method comprises a phase of establishing a reference after installation of the probe 102 on the part 100.

In the embodiment of the invention presented here and after having bonded the probe 102, the establishment phase comprises positioning the contact face 203, 303 of a tool 200, 300 at a precise location on the part 100 and then in making the transmitters of the probe 102 transmit ultrasound waves 108. Following transmission and after reflection, the sensors of the probe 102 receive sound waves 108, and the establishment phase lastly comprises recording the combined signals after processing by the processing unit following reception. Thus, a reference recording is established for the probe 102 bonded to the part 100 for a particular tool 200, 300 positioned at a precise location. The combined signals may also be recorded in the form of their frequency spectrum.

The reference recording thus includes the combined signals that relate to the region to be monitored 104 and to the known defect 204, 304 of the tool 200, 300 shortly after installation of the probe 102 and therefore constitutes a baseline for later checks on the region to be monitored 104. In one embodiment, the reference recording comprises, for example, a snapshot of the image on the screen, in which the echoes of the region to be monitored 104 and of the known defect 204, 304 are visible.

In one embodiment, the reference recording also includes the information regarding the tool 200, 300 used and where the precise location of placement of its contact face 203, 303 on the part 100 is. Regarding the tool 200, 300, the information contain, for example, the dimensions of the bores 204, 304, the positions of the bores 204, 304, the angle of rotation of the drum 310, and any other information for identifying the tool 200, 300 and its orientation.

In one embodiment, the reference recording also includes the data relating to the ultrasound waves generated, duration, strength, direction, etc.

In one embodiment, the reference recording also includes the frequency spectrum of the combined signals that relate to the region to be monitored 104 and to the known defect 204, 304 of the tool 200, 300.

After bonding and installation of the probe 102, the establishment phase thus comprises:
- a placement step in which the contact face of a tool 200, 300 is placed at a precise location on a face of the part 100, where the tool 200, 300 comprises a block comprising a material that allows the transmission of the ultrasound waves in which a known defect 204, 304 is embedded and which comprises a contact face 203, 303 that bears against a face of the part 100,
- an activation step in which ultrasound waves 108 are transmitted by the transmitters of the probe 102, received by the sensors of the probe 102, and transformed into combined signals by the control unit of the probe 102, and
- a data recording step in which, following the reception, the signals thus combined are stored in the form of a reference recording in a memory, for example a USB stick, databases, etc.

Over the service life of the part 100 and of the probe 102, regular measurements are taken in order to check the state of the region to be monitored 104 and of the probe 102.

Thus, when inspecting the part 100, ultrasound waves 108 are transmitted by the transmitters of the probe 102 and received by the sensors of the probe 102. The signals transmitted by the sensors of the probe 102 are combined by the control unit. A frequency spectrum of the combined signals is then established by the control unit and compared with a frequency spectrum of combined signals relating to the region to be monitored 104 of the reference recording. When the frequency spectrum is used in graph form, the comparison may be made visually by a technician or performed by computer using suitable comparison software such as, for example, image comparison software.

As explained above, the frequency spectrum of combined signals relating to the region to be monitored 104 of the reference recording may be stored as is in the memory, or be calculated at the time of the comparison from the combined signals relating to the region to be monitored 104 of the reference recording.

If the comparison is positive, i.e., the frequency spectrum of the combined signals of the present measurement and the frequency spectrum of the combined signals of the reference recording are identical or close enough to be considered identical, then the inspection is considered validated with the probe 102 still properly bonded and calibrated. The probe 102 may then be used to carry out a diagnosis of the region to be monitored 104 in order to check for the absence and/or presence and/or change in a structural defect in the part 100. In one particular embodiment, the comparison is positive when the frequency spectrum of the combined signals of the present measurement and the frequency spectrum of the combined signals of the reference recording differ by +/−10% with respect to the reference recording.

If the comparison is negative, i.e., the frequency spectrum of the combined signals of the present measurement and the frequency spectrum of the combined signals of the reference recording are divergent enough to be considered different (for example beyond +/−10%), then the inspection is considered not validated. The difference may then be due either to a change in the region to be monitored, or to unbonding or an error in the calibration of the probe 102.

In that case, the tool 200, 300 used in the establishment phase is put back in the position recorded as the precise location of establishment of the reference recording, and the transmitters of the probe 102 are activated according to the data relating to the ultrasound waves generated in the establishment phase in order to generate the same ultrasound waves 108 as in the establishment phase and these ultrasound waves are received by the sensors of the probe 102, the electrical signals from which are transmitted and combined by the control unit. These combined signals are then compared with the combined signals of the reference recording relating to the known defect 204, 304.

If the comparison is positive, i.e., the combined signals of the present measurement corresponding to the known defect 204, 304 are identical or close enough to those of the reference recording, then this confirms that the probe 102 is still sufficiently well bonded and calibrated, but that the performance of the probe 102 has changed. In one particular embodiment, the comparison is positive when the combined signals of the present measurement and the combined signals of the reference recording differ by +/−10% with respect to the reference recording.

The combined signals relating to the region to be monitored 104 and to the known defect 204, 304 are then recorded in the reference recording, replacing the preceding combined signals.

If the comparison is negative, i.e., the combined signals corresponding to the known defect 204, 304 are divergent enough to be considered different from those of the reference recording (for example beyond +/−10%), then this confirms that the probe 102 has either come unbonded or is poorly calibrated. In that case, the probe 102 should be checked and potentially replaced.

Thus, over the service life of the probe 102, a method for checking the probe 102 then comprises:
- a provision step in which the part 100 to which the probe 102 is attached is provided,
- a first retrieval step in which the reference recording relating to the probe 102 is retrieved from the memory in which it is stored,
- a first activation step in which ultrasound waves 108 are transmitted by the transmitters of the probe 102, received by the sensors of the probe 102, and transformed into combined signals by the control unit of the probe 102,
- a first comparison step in which the frequency spectrum of the signals thus combined is compared with the frequency spectrum of combined signals relating to the region to be monitored 104 of the reference recording, if the comparison is positive, the checking method is stopped, and the probe 102 is therefore well bonded and calibrated and may be used to perform a diagnosis on the part 100, if the comparison is negative, the checking method continues with:
- a second retrieval step in which the tool 200, 300 comprising a block comprising a material that allows the transmission of the ultrasound waves in which a known defect 204, 304 is embedded and which comprises a contact face 203, 303, and the information for which is recorded in the reference recording, is retrieved,
- a placement step in which the contact face 203, 303 of the tool 200, 300 thus retrieved is placed at the precise location for establishing the reference recording,
- a second activation step in which ultrasound waves 108 are transmitted by the transmitters of the probe 102, received by the sensors of the probe 102, and transformed into combined signals by the control unit of the probe 102, and a second comparison step in which the signals thus combined are compared with the combined signals relating to the known defect 204, 304 of the reference recording, if the comparison is positive, the checking method continues with a recording step in which the signals thus combined are recorded in the reference recording, if the comparison is negative, the checking method continues with a maintenance step, in which the probe 102 undergoes maintenance operations, such as rebonding and/or replacement.

Figure 6:
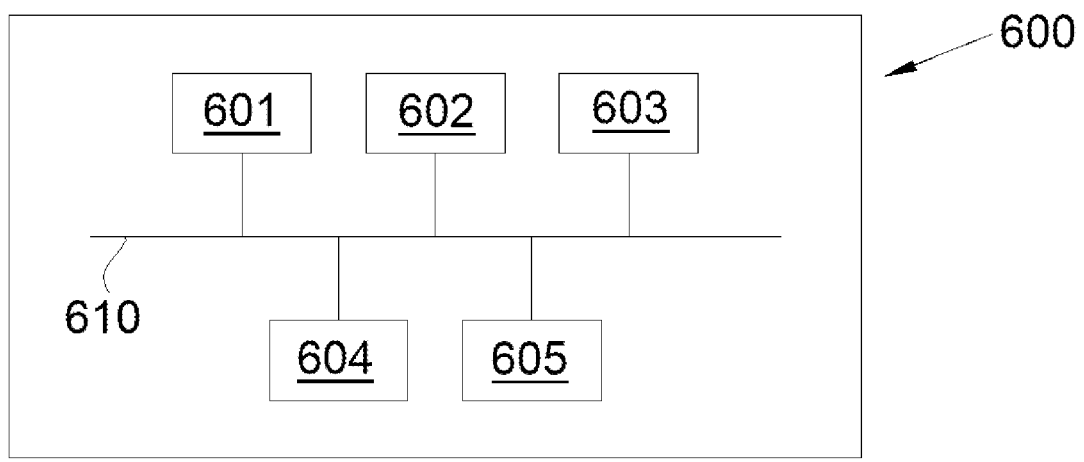

FIG. 6 schematically illustrates one example of the hardware architecture of the control unit 600 of the probe 120.

The control unit 600 then comprises, connected by a communication bus 610: a processor or CPU ("central processing unit") 601; a random access memory RAM 602; a read-only memory ROM 603; a data storage device 604; and a set of interfaces 605 allowing the control unit 600 to communicate with the transmitters, the sensors and the external elements such as the screen 110.

The processor 601 is capable of executing instructions loaded into the RAM 602 from the ROM 603. When the probe 102 is powered up, the processor 601 is capable of reading instructions from the RAM 602 and of executing them. These instructions form a computer program which causes the processor 601 to implement all or some of the algorithms and steps described above.

All or some of the algorithms and steps described above may be implemented in software form through the execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for checking an ultrasound probe, comprising:

providing a part having a region to be monitored and to which the probe is attached, in a provision step, retrieving a reference recording relating to the probe from a memory in which the reference recording is stored, in a first retrieval step, transmitting ultrasound waves at least one transmitter of the probe, the ultrasound waves having been received by at least one sensor of the probe, and transformed into combined signals by a control unit of the probe, in a first activation step, comparing a frequency spectrum of the signals thus combined with a frequency spectrum of combined signals relating to the region to be monitored of the reference recording, in a first comparison step, if the comparison is positive, the checking method is stopped, the comparison being deemed positive when the frequency spectrum of the combined signals of the present measurement and the frequency spectrum of the combined signals of the reference recording differ by +/−X % with respect to the reference recording, X being a number within a range of 2-15, if the comparison is negative, the checking method continues with:

retrieving a tool comprising a block comprising a material that allows the transmission of the ultrasound waves in which a known defect is embedded and which comprises a contact face, and information for which is recorded in the reference recording, in a second retrieval step, placing the contact face of the tool thus retrieved at a precise location for establishing the reference recording, transmitting ultrasound waves by the at least one transmitter of the probe, receiving the ultrasound waves by the at least one sensor of the probe, and transforming the ultrasound waves into combined signals by the control unit of the probe, in a placement step, in a second activation step, and comparing the signals thus combined with combined signals relating to the known defect of the reference recording, in a second comparison step, if the comparison is positive, the checking method continues with a recording step in which the signals thus combined are recorded in the reference recording, the comparison being deemed positive when the combined signals of the present measurement and the combined signals of the reference recording differ by +/−Y % with respect to the reference recording, Y being a number within a range of 2-15, if the comparison is negative, the checking method continues with undertaking maintenance operations of the probe in a maintenance step.

2. The checking method according to claim 1, wherein X is equal to 10.

3. The checking method according to claim 1, wherein Y is equal to 10.

4. The checking method according to claim 1, further comprising a phase of establishing a reference after an installation of the probe on the part, and wherein the establishment phase comprises:

placing a contact face of a tool comprising a block comprising a material that allows the transmission of the ultrasound waves in which a known defect is embedded at a precise location on a face of the part, in a placement step, transmitting ultrasound waves by the at least one transmitter of the probe, received by the at least one sensor of the probe, and transformed into combined signals by the control unit of the probe, in an activation step, and storing the signals thus combined as a reference recording in a memory, in a data recording step.

* * * * *